US012699478B2

(12) United States Patent
Wang et al.

(10) Patent No.: US 12,699,478 B2
(45) Date of Patent: Aug. 4, 2026

(54) DISPLAY PANEL AND DISPLAY DEVICE

(71) Applicants:WUHAN TIANMA MICROELECTRONICS CO., LTD., Wuhan (CN); WUHAN TIANMA MICROELECTRONICS CO., LTD. SHANGHAI BRANCH, Shanghai (CN)

(72) Inventors: Qingxia Wang, Shanghai (CN); Ruiqi Huang, Shanghai (CN); Peng Zhang, Shanghai (CN); Yaolin Wang, Shanghai (CN); Xi Chen, Shanghai (CN); Shanshan Cong, Shanghai (CN)

(73) Assignees: WUHAN TIANMA MICROELECTRONICS CO., LTD., Wuhan (CN); WUHAN TIANMA MICROELECTRONICS CO., LTD. SHANGHAI BRANCH, Shanghai (CN)

( * ) Notice: Subject to any disclaimer, the term of this patent is extended or adjusted under 35 U.S.C. 154(b) by 0 days.

(21) Appl. No.: 18/597,934

(22) Filed: Mar. 7, 2024

(65) Prior Publication Data

US 2024/0211069 A1      Jun. 27, 2024

(30) Foreign Application Priority Data

Jul. 20, 2023      (CN) ......................... 202310898696.3

(51) Int. Cl.
*G06F 3/041* (2006.01)
(52) U.S. Cl.
CPC ........ *G06F 3/04164* (2019.05); *G06F 3/0412* (2013.01); *G06F 2203/04102* (2013.01)

(58) Field of Classification Search
CPC .............. G06F 3/04164; G06F 3/0412; G06F 2203/04102; G06F 3/0443; G06F 3/0446; G06F 3/00; Y02E 10/549; G02F 1/136286; H10D 86/60; H10D 86/441; H10K 59/131; H10K 59/40
See application file for complete search history.

(56) References Cited

U.S. PATENT DOCUMENTS

| | | | | |
|---|---|---|---|---|
| 2015/0091590 A1* | 4/2015 | Jung | ..................... | G06F 3/0445 |
| | | | | 324/685 |
| 2017/0170206 A1* | 6/2017 | Lee | ....................... | H10K 77/111 |
| 2017/0288007 A1* | 10/2017 | Shin | ....................... | G02F 1/1345 |

(Continued)

FOREIGN PATENT DOCUMENTS

CN          113690258 A      11/2021

*Primary Examiner* — Chanh D Nguyen
*Assistant Examiner* — Jarurat Suteerawongsa
(74) *Attorney, Agent, or Firm* — KILPATRICK TOWNSEND & STOCKTON LLP

(57) ABSTRACT

A display panel and a display device are provided. The display panel is divided into an active area and a non-active area. The non-active area is divided into a first area, a flexible area and a second area sequentially arranged towards the active area. The display panel includes a substrate, an array layer, a touch wiring and a first signal wiring. The touch wiring includes a first touch lead, a second touch lead and a third touch lead that are electrically connected. The first touch lead is at least partially arranged in the array layer on a side of a first via hole group away from the flexible area. This display panel is developed into an in-cell touch panel.

16 Claims, 13 Drawing Sheets

(56) References Cited

U.S. PATENT DOCUMENTS

| | | | |
|---|---|---|---|
| 2020/0111843 A1* | 4/2020 | Han | G06F 3/0412 |
| 2021/0118958 A1* | 4/2021 | Park | H10K 59/805 |
| 2021/0200363 A1* | 7/2021 | Lee | H10K 50/84 |
| 2021/0255734 A1* | 8/2021 | Xie | G06F 3/04164 |
| 2022/0350457 A1 | 11/2022 | Li et al. | |
| 2023/0350516 A1* | 11/2023 | Wang | G06F 3/044 |

\* cited by examiner

DISPLAY PANEL AND DISPLAY DEVICE

The present application claims the priority to Chinese Patent Application No. 202310898696.3, titled "DISPLAY PANEL AND DISPLAY DEVICE", filed on Jul. 20, 2023 with the China National Intellectual Property Administration, which is incorporated herein by reference in its entirety.

FIELD

The present disclosure relates to the field of display, and in particular to a display panel, and a display device including the display panel.

BACKGROUND

As the touchscreen technology advances, increasing display panels have developed into touch panels. That is, these display panels are sensitive to touch on themselves in addition to display information. At present, out-cell touch panels are fairly common while in-cell touch panels are rare.

SUMMARY

The following embodiments are provided according to the present disclosure, to solve the above problem.

A display panel is provided. The display panel is divided into an active area and a non-active area. The non-active area is divided into a first area, a flexible area and a second area, the first area. The flexible area and the second area are sequentially arranged towards the active area. The display panel includes a substrate, an array layer arranged on a side of the substrate, a touch wiring and a first signal wiring. The touch wiring includes a first touch lead, a second touch lead and a third touch lead that are electrically connected. The first touch lead is at least partially arranged in the first area. The second touch lead is at least partially arranged in the flexible area. The third touch lead is at least partially arranged in the second area. The first signal wiring is arranged in the array layer and includes a first segment and a second segment that are electrically connected. The first segment is at least partially arranged in the first area. The second segment is at least partially arranged in the flexible area. The first segment is arranged in a different layer from the second segment and is electrically connected to the second segment through a first via hole group. The first touch lead is at least partially arranged in the array layer on a side of the first via hole group away from the flexible area.

A display device is further provided. The display device includes the display panel described above.

BRIEF DESCRIPTION OF THE DRAWINGS

In order to illustrate embodiments of the present disclosure more clearly, the drawings to be used in the description of the embodiments are briefly described below.

DETAILED DESCRIPTION

The embodiments of the present disclosure are described clearly and completely in conjunction with the drawings in the embodiments of the present disclosure hereinafter. It is apparent that only some embodiments rather than all the embodiments of the present disclosure are described herein.

Various details are set forth in the following description to facilitate a full understanding of the present disclosure. In fact, the present disclosure may be implemented in other ways different from those described herein. Therefore, the present disclosure is not limited to the embodiments disclosed below.

The present disclosure is described in detail in conjunction with the drawings. For ease of illustration, sectional views of the device structure is partially enlarged instead of draw to scale in the embodiments of the present disclosure. The drawings are merely illustrative, and thus are not intended to limit the protection scope of the present disclosure. In addition, spatial dimensions of length, width and depth should be taken into account in practice.

As described in the BACKGROUND, out-cell touch panels are fairly common while in-cell touch panels are rare at present.

Figure 1:
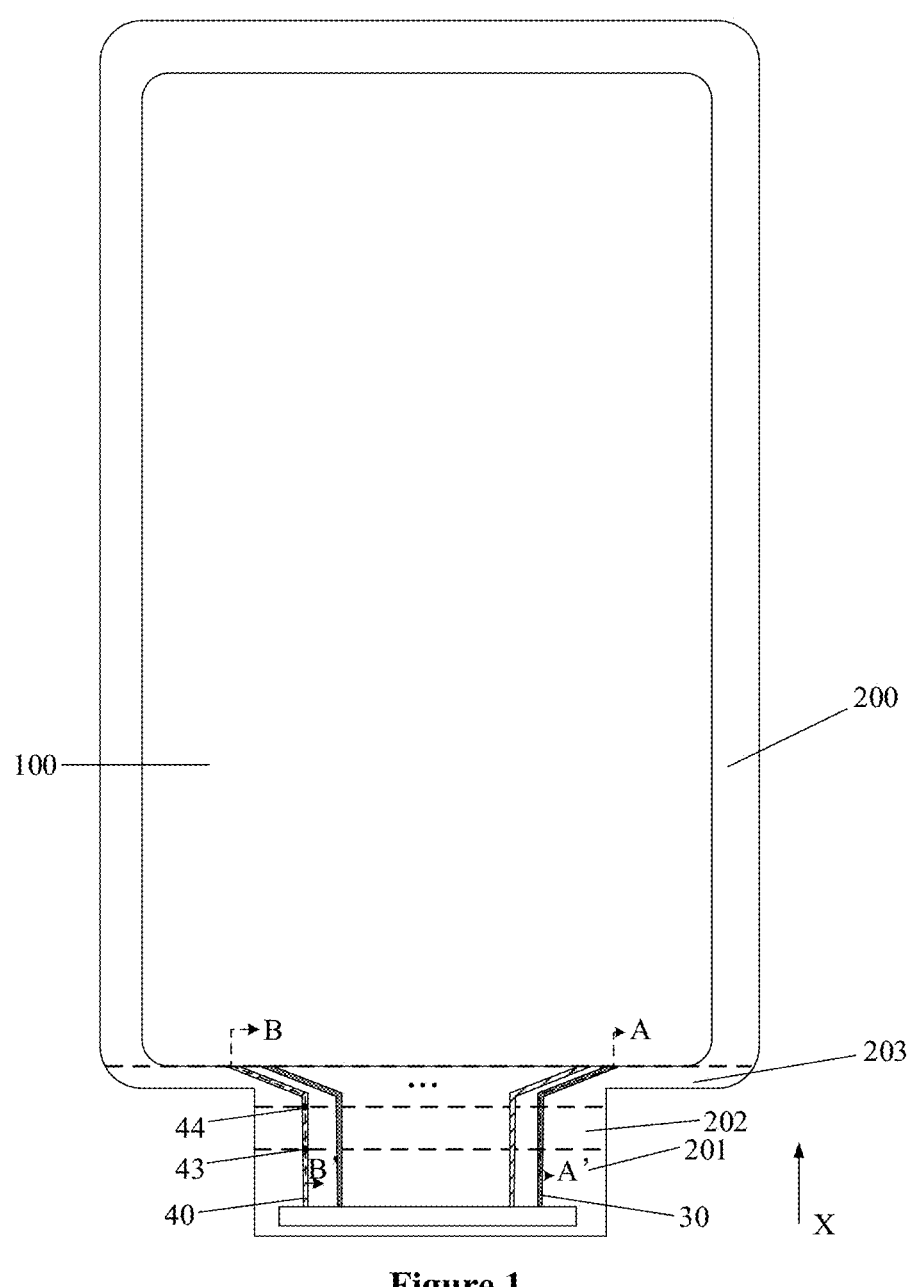
FIG. 1 is a top view of a display panel according to an embodiment of the present disclosure.
Figure 2:
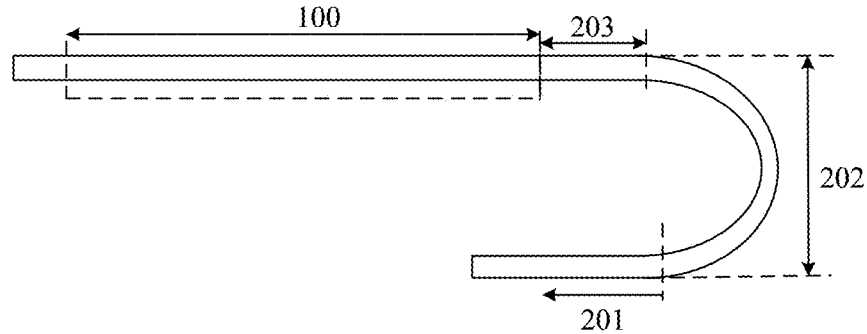
FIG. 2 is a side view of the display panel when being bent according to an embodiment of the present disclosure.

In view of this, a display panel is provided according to embodiments of the present disclosure. FIG. 1 is a schematic diagram illustrating the display panel according to an embodiment of the present disclosure. FIG. 2 is a schematic diagram illustrating the display panel when being bent according to an embodiment of the present disclosure. In the embodiments, the display panel is divided into an active area 100 and a non-active area 200. The non-active area 200 includes a first area 201, a flexible area 202, and a second area 203. The first area 201, the flexible area 202 and the second area 203 are arranged sequentially towards the active area. That is, the non-active area 200 includes the first area 201, the flexible area 202, and the second area 203 that are arranged in a direction X from the non-active area 200 towards the active area 100. The first area 201 is arranged on a side of the flexible area 202 away from the active area 100. The flexible area 202 is arranged on a side of the second area 203 away from the active area 100.

Figure 3:
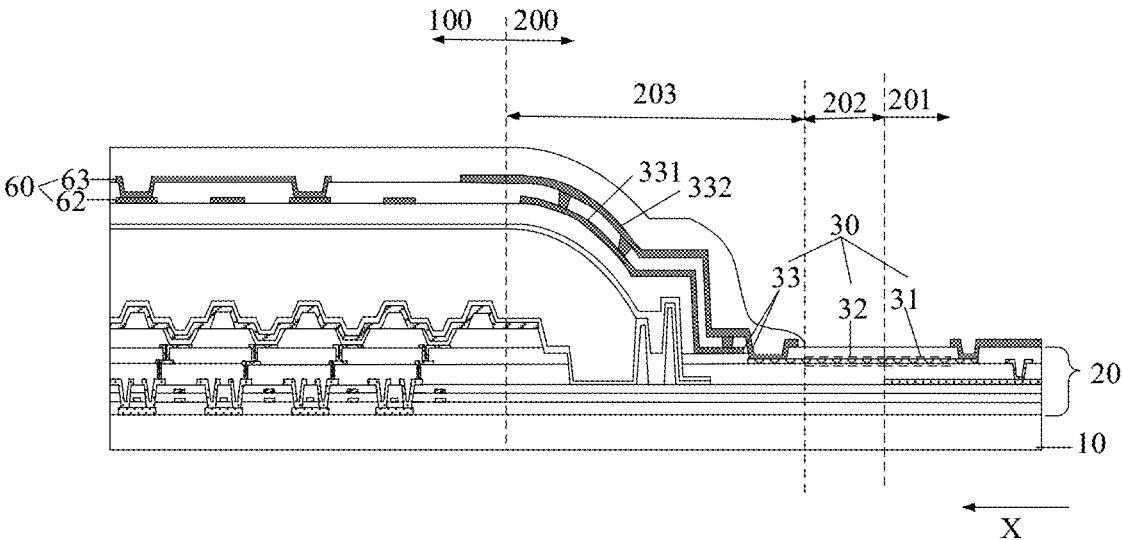
FIG. 3 is a sectional view of the display panel according to an embodiment of the present disclosure.
Figure 4:
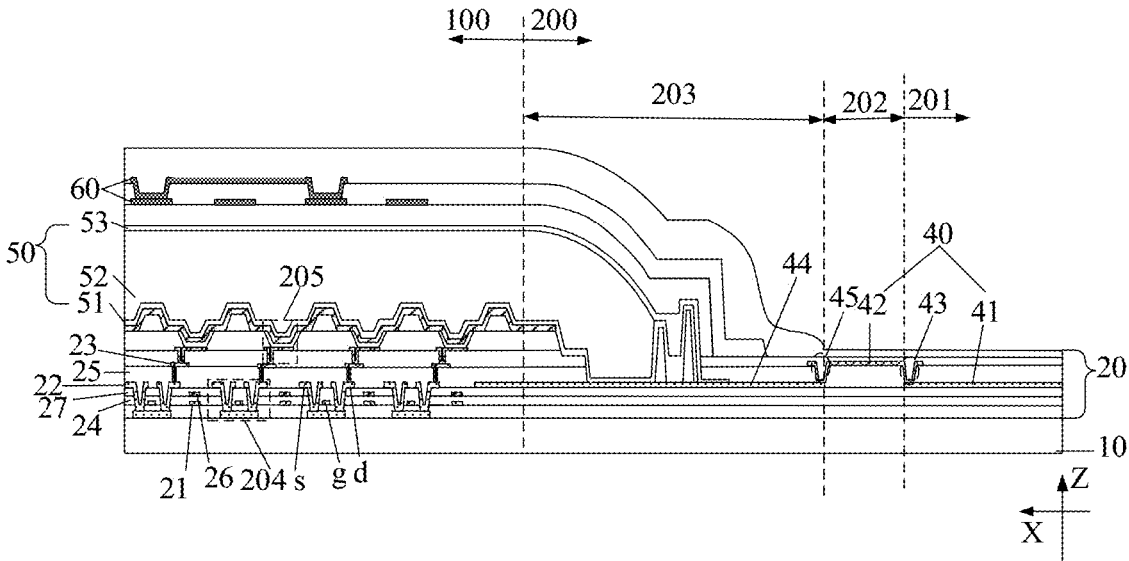
FIG. 4 is a sectional view of the display panel according to another embodiment of the present disclosure.

FIG. 3 is a sectional view of the display panel when cut along a line AA' as shown in FIG. 1. FIG. 4 is a sectional view of the display panel along a line BB' as shown in FIG. 1. The display panel according to the embodiments of the present disclosure includes a substrate 10, an array layer 20, a touch wiring 30 and a first signal wiring 40. The array layer 20 is arranged on a side of the substrate 10. The touch wiring 30 includes a first touch lead 31, a second touch lead 32, and a third touch lead 33 that are electrically connected. The first touch lead 31 is at least partially arranged in the first area 201. The second touch lead 32 is at least partially arranged in the flexible area 202. The third touch lead 33 is at least partially arranged in the second area 203. The first signal wiring 40 is arranged in the array layer 20, and includes a first segment 41 and a second segment 42 that are electrically connected. The first segment 41 is at least partially arranged in the first area 201. The second segment 42 is at least partially arranged in the flexible area 202. The first segment 41 and the second segment 42 are arranged in different layers and are electrically connected through a first via hole 43. It should be noted that in the embodiments, the first area 201 is arranged on a side of the first via hole 43 away from the active area 100. The flexible area 202 is arranged on a side of the first via hole 43 facing the active area 100.

In some embodiments, as shown in FIG. 4, the first signal wiring 40 includes a third segment 44 arranged in the second area 203. The third segment 44 is electrically connected to the second segment 42 through a third via hole 45. The flexible area 202 is arranged between the first via hole 43 and the third via hole 45.

From the above description, it can be seen that the display panel according to the embodiment of the present disclosure includes the touch wiring. That is, the display panel embedded inside with the touch wiring functions as a touch panel. In one embodiment, on the side of the first via hole away from the active area, the first touch lead is at least partially arranged in the array layer, that is, a part of the first touch lead arranged in the first area is at least partially arranged in the array layer, and the touch wiring is at least partially arranged in the array layer.

As shown in FIG. 4, in some embodiments, the array layer includes the signal wiring, multiple pixel circuits arranged in an array, and multiple display units 205 arranged in an array. Each of the pixel circuits includes a thin film transistor 204. The thin film transistor 204 includes a gate g, a source s, and a drain d. The display unit 205 includes an anode layer, a light-emitting layer and a cathode layer that are arranged along a direction Z perpendicular to a plane where the substrate 10 is located. The anode layer is electrically connected to the drain d of the thin film transistor 204. One thin film transistor 204 corresponds to at least one display unit 205, to control a display state of the display unit 205. That is, the display units are separately controlled.

As shown in FIG. 4, in some embodiments, the array layer 20 includes a first metal layer 21, a second metal layer 22, and a third metal layer 23 that are arranged along the direction Z perpendicular to the plane where the substrate 10 is located. A first insulation layer 24 is arranged between the first metal layer 21 and the second metal layer 22. A second insulation layer 25 is arranged between the second metal layer 22 and the third metal layer 23. In the embodiments, the gate g of the thin film transistor 204 is arranged in the first metal layer 21, and the source s and the drain d of the thin film transistor 204 are arranged in the second metal layer 22.

In some embodiments of the present disclosure, the first metal layer includes a molybdenum layer. The second metal layer includes a first titanium metal layer, an aluminum metal layer, and a second titanium metal layer that are stacked. The third metal layer includes a first titanium metal layer, an aluminum metal layer, and a second titanium metal layer that are stacked. For example, the first metal layer has a thickness of 3000 angstroms. In the second metal layer, the first titanium metal layer, the aluminum metal layer, and the second titanium metal layer have a thickness of 500 angstroms, a thickness of 7000 angstroms, and a thickness of 400 angstroms, respectively. That is, in the second metal layer, the aluminum metal layer has the thickness of 7000 angstroms, the first titanium metal layer arranged on a side of the aluminum metal layer facing the substrate has the thickness of 500 angstroms, and the second titanium metal layer arranged on a side of the aluminum metal layer away from the substrate has the thickness of 400 angstroms. In the third metal layer, the first titanium metal layer, the aluminum metal layer, and the second titanium metal layer have a thickness of 600 angstroms, a thickness of 6500 angstroms, and a thickness of 400 angstroms, respectively. That is, in the third metal layer, the aluminum metal layer has the thickness of 6500 angstroms, the first titanium metal layer arranged on a side of the aluminum metal layer facing the substrate has the thickness of 600 angstroms, and the second titanium metal layer arranged on a side of the aluminum metal layer away from the substrate has the thickness of 400 angstroms. However, the thickness of each of the layers is not limited in the present disclosure but depends on the situations.

Based on the above embodiments, as shown in FIG. 4, in some embodiments of the present disclosure, the array layer 20 further includes a fourth metal layer 26 arranged between the first metal layer 21 and the second metal layer 22. The first insulation layer 24 is arranged between the first metal layer 21 and the fourth metal layer 26. A third insulation layer 27 is provided between the fourth metal layer 26 and the second metal layer 22.

As shown in FIG. 4, the array layer 20 further includes a first planarization layer arranged between the third metal layer 23 and the anode layer, and a pixel definition layer arranged between the anode layer and the cathode layer. The pixel definition layer is provided with multiple openings, and the light-emitting layer is arranged in the openings.

Based on the above embodiments, in some embodiments of the present disclosure, the display panel further includes a sealing layer 50 for encapsulating the active area 100 of the display panel, to protect the display units in the display panel from water and oxygen. In some embodiments of the present disclosure, the sealing layer 50 includes a first sealing layer 51, a second sealing layer 52, and a third sealing layer 53 that are arranged along the direction perpendicular to the plane where the substrate 10 is located. The first sealing layer 51 and the third sealing layer 53 are inorganic for watertight and airtight purposes, and the second sealing layer 52 is organic.

In some embodiments of the present disclosure, the display panel further includes a retaining wall structure arranged in the second area. The retaining wall structure includes a first retaining wall and a second retaining wall that are arranged along the direction X from the non-active area 200 towards the active area 100. The second retaining wall is configured to locate the second sealing layer 52. The first retaining wall is configured to prevent the second sealing layer 52 from extending into the flexible area.

Figure 5:
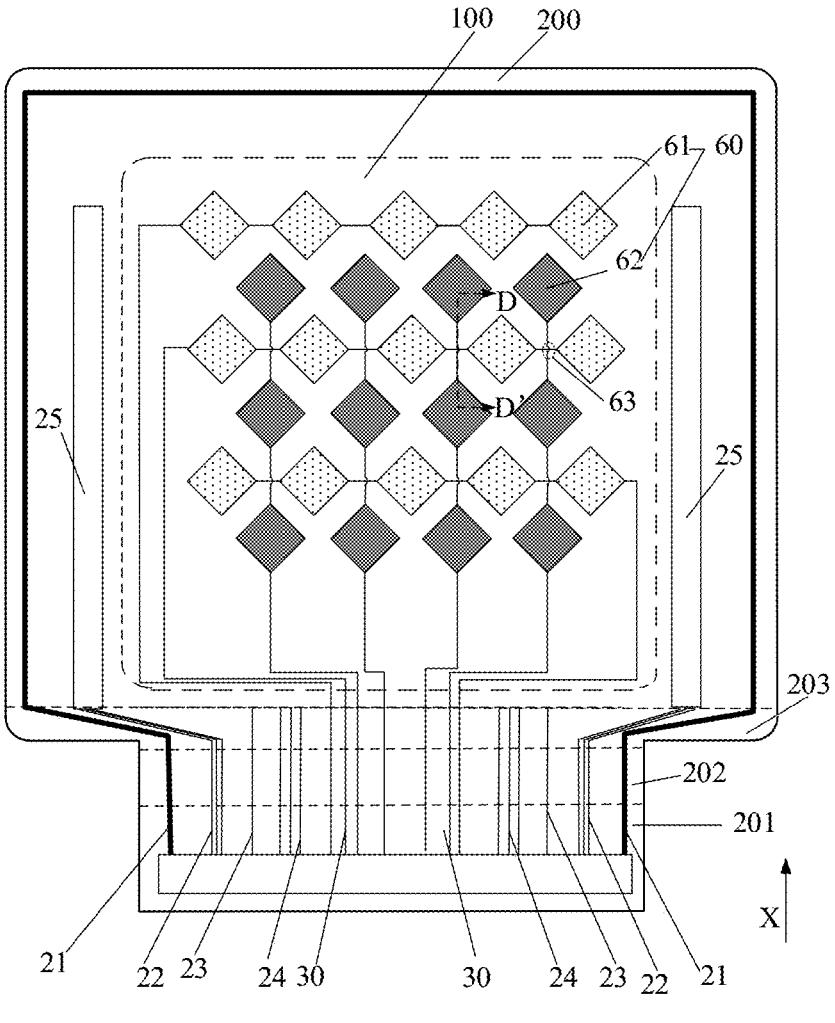
FIG. 5 is a top view of the display panel according to another embodiment of the present disclosure.

Based on any one of the above embodiments, in some embodiments of the present disclosure, as shown in FIG. 5, the signal wiring includes a first power supply signal wiring 21 (PVEE), a gate driving signal wiring 22, a second power supply signal wiring 23 (PVDD), a data wiring 24, and the like. In some embodiments, the gate driving signal wiring 22 is a clock signal wiring or a low-level signal wiring that is electrically connected to a gate driving circuit 25, which is not limited in the present disclosure but depends on the situations.

As shown in FIG. 5, the display panel further includes multiple touch electrodes 60 arranged in the active area 100. The touch electrodes 60 are configured to sense a touch. As shown in FIG. 4, in some embodiments of the present disclosure, the multiple touch electrodes 60 are arranged on a side of the sealing layer 50 away from the substrate 10, which is not limited in the present disclosure. In other embodiments of the present disclosure, the multiple touch electrodes are arranged on a side of the sealing layer facing the substrate, depending on the situations.

Figure 6:
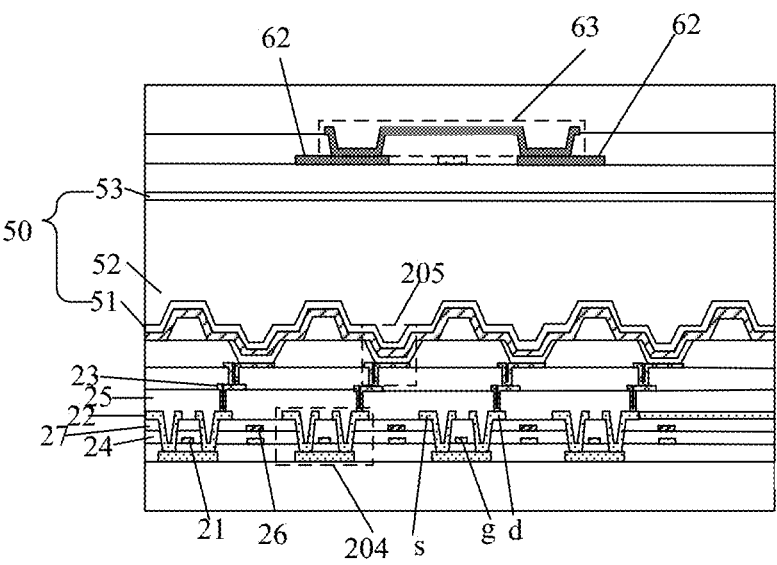
FIG. 6 is a sectional view of the display panel according to another embodiment of the present disclosure.

FIG. 6 is a sectional view of the display panel cut along a line DD' as shown in FIG. 5. In some embodiments of the present disclosure, the multiple touch electrodes are divided into first touch electrodes 61 and second touch electrodes 62. In some embodiments of the present disclosure, the first touch electrodes 61 and the second touch electrodes 62 are arranged in a same layer. In the first direction X, one first touch electrode 61 is directly electrically connected to another first touch electrode 61. In the second direction Y, one second touch electrode 62 is electrically connected to another second touch electrode 62 through a bridge 63.

In an embodiment of the present disclosure, each of the touch electrodes includes a first titanium metal layer, an aluminum metal layer, and a second titanium metal layer that are stacked, and have a thickness of 500 angstroms, a thickness of 3000 angstroms, and a thickness of 500 angstroms, respectively. That is, in the touch electrode, the aluminum metal layer has the thickness of 3000 angstroms, the first titanium metal layer arranged on a side of the aluminum metal layer facing the substrate has the thickness of 500 angstroms, and the second titanium metal layer arranged on a side of the aluminum metal layer away from the substrate has the thickness of 500 angstroms. The bridge also includes a first titanium metal layer, an aluminum metal layer, and a second titanium metal layer that are stacked and have a thickness of 500 angstroms, a thickness of 1500 angstroms, and a thickness of 700 angstroms, respectively. That is, in the bridge, the aluminum metal layer has the thickness of 1500 angstroms, the first titanium metal layer arranged on a side of the aluminum metal layer facing the substrate has the thickness of 500 angstroms, and the second titanium metal layer arranged on a side of the aluminum metal layer away from the substrate has the thickness of 700 angstroms. However, the thickness of each of the layers is not limited in the present disclosure but depends on the situations.

Based on any one of the above embodiments, in some embodiments of the present disclosure, the first signal wiring is the data wiring, which is not limited in the present disclosure. In other embodiments of the present disclosure, the first signal wiring is the second power supply signal wiring or the gate driving signal wiring, depending on the situations. The display panel according to the embodiments of the present disclosure is described below with the first signal wiring as the data wire.

Figure 7:
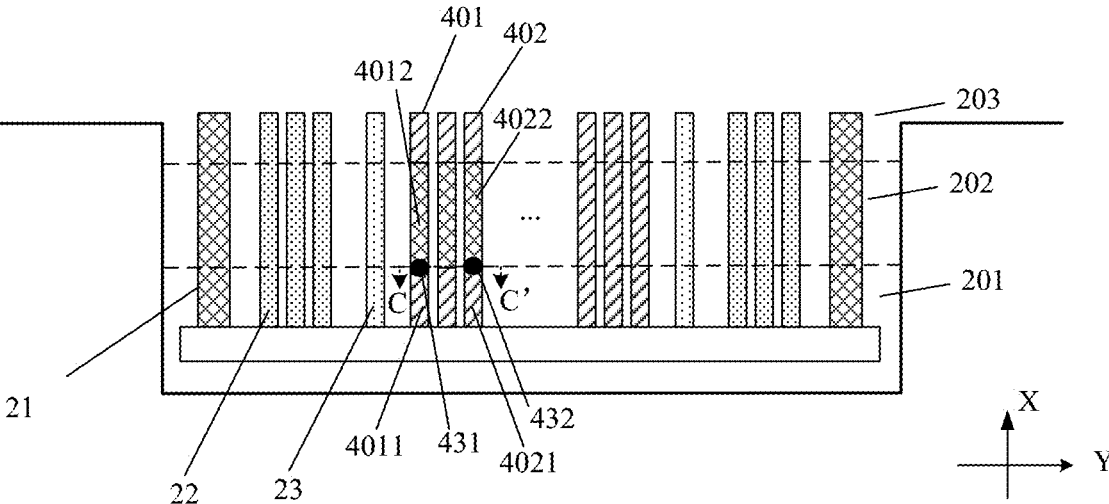
FIG. 7 is a top view of a lower margin of the display panel according to another embodiment of the present disclosure.

Reference is made to FIG. 7, which shows the lower margin of the display panel as shown in FIG. 5 being partially enlarged. The first signal wiring includes a first signal wire 401 and a second signal wire 402. The first via hole group includes a first via hole 431 and a second via hole 432. The first signal wire 401 includes a first segment 4011 and a second segment 4012 that are electrically connected through the first via hole 431. The second signal wire 402 includes a first segment 4021 and a second segment 4022 that are electrically connected through the second via hole 432. It should be noted that although FIG. 7 illustrates an example that the first signal wiring is the data wiring, which is not limited in the present disclosure. In other embodiments of the present disclosure, the first signal wiring is another signal wiring, depending on the situations. In some embodiments of the present disclosure, the first signal wiring is the data wiring, and the display panel includes multiple data wires. Each of the multiple data wires includes a first segment and a second segment that are arranged in different layers. The first segments are electrically connected to the corresponding second segments through respective via holes. For example, the multiple data wires include a first data wire (i.e., the first signal wire 401) and a second data wire (i.e., the second signal wire 402). The first data wire includes the first segment 4011 and the second segment 4012 that are electrically connected through the first via hole 431. The second data wiring includes the first segment 4021 and the second segment 4022 that are electrically connected through the second via hole 432.

Figure 8:
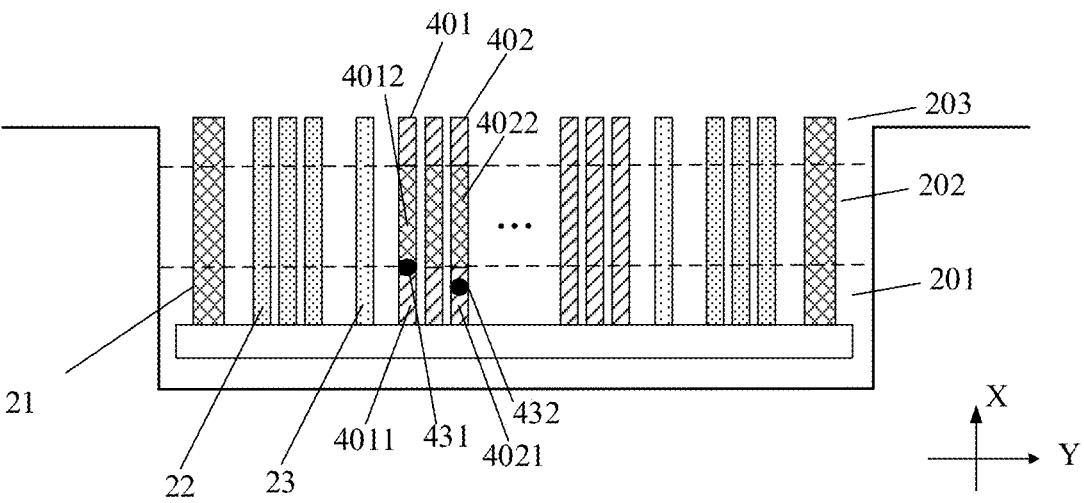
FIG. 8 is a sectional view of the lower margin of the display panel according to another embodiment of the present disclosure.

In some embodiments of the present disclosure, as shown in FIG. 7, the first via hole 431 and the second via hole 432 are arranged on a same straight line. The straight line is parallel to a fold of the flexible area 202. That is, in the first direction X, a distance from the first via hole 431 to the fold of the flexible area 202 is equal to a distance from the second via hole 432 to the fold of the flexible area 202. In other embodiments of the present disclosure, as shown in FIG. 8, the first via hole 431 and the second via hole 432 are arranged in a same straight line. The straight line intersects with the fold of the flexible area 202. That is, in the first direction X, the distance from the first via hole 431 to the fold of the flexible area 202 is different from the distance from the second via hole 432 to the fold of the flexible area 202. This is not limited in the present disclosure but depends on the situation.

Figure 9:
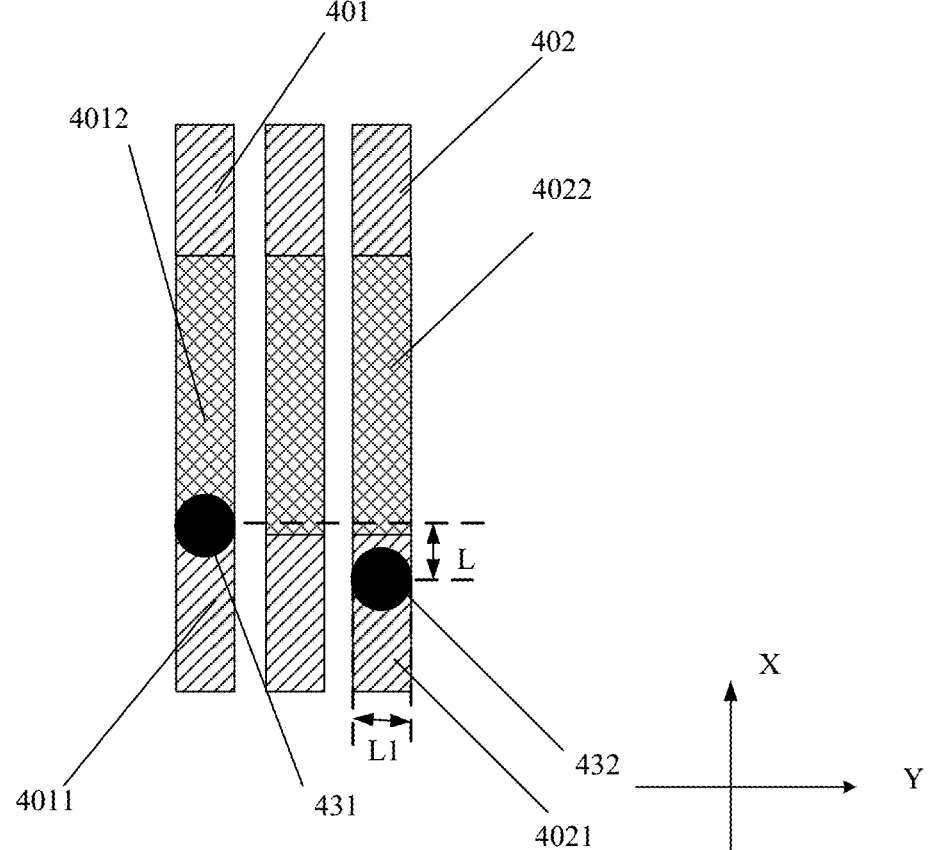
FIG. 9 is a sectional view of the lower margin of the display panel as shown in FIG. 8 being partially enlarged.

Reference is made to FIG. 9, which is a sectional view of the lower margin of the display panel as shown in FIG. 8 being partially enlarged. In some embodiments, the first via hole 431 and the second via hole 432 are arranged in a same straight line, and the straight line intersects with the fold of the flexible area 202. A minimum distance from the first via hole 431 to the second via hole 432 in the first direction X is L. The first via hole is L1 in diameter, where $0 \leq L \leq 5L1$. Therefore, a distance from the first via hole 431 corresponding to the first sub-signal wire 401 to the second via hole 432 corresponding to the second sub-signal wire 402 is short in the first direction. That is, the via hole for electrically connecting the first and second segments of one data wire is arranged at a short distance from the via hole for electrically connecting the first and second segments of another data wire.

It should be noted that in practice a diameter of the first via hole varies in the direction perpendicular to the plane where the substrate is located. In some embodiments of the present disclosure, the diameter of the first via hole is a longest chord of the first via hole, as shown in FIG. 9, which is not limited in the present disclosure. In other embodiments of the present disclosure, the diameter of the first via hole is a middle chord of the first via hole or an average of chords of the first via hole in the first direction, depending on the situations.

Figure 10:
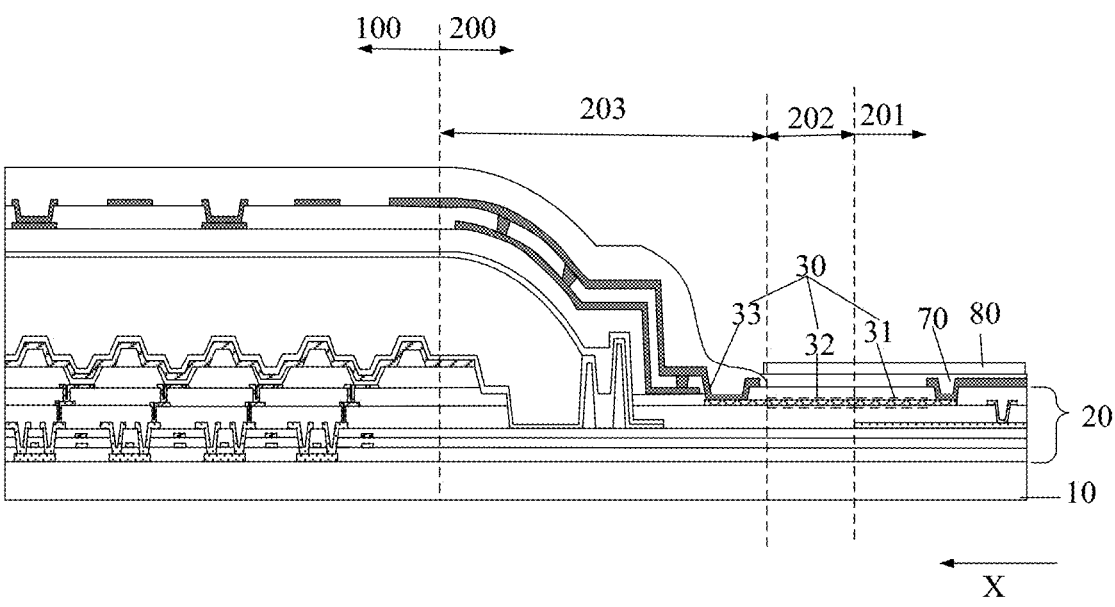
FIG. 10 is a sectional view of the display panel according to another embodiment of the present disclosure.
Figure 11:
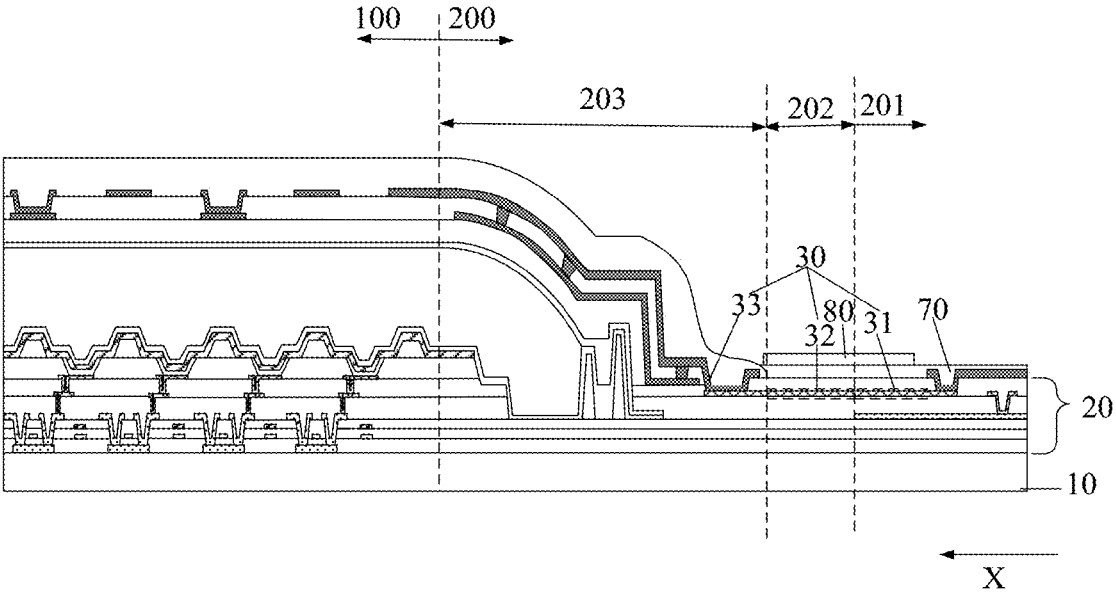
FIG. 11 is a sectional view of the display panel according to another embodiment of the present disclosure.
Figure 12:
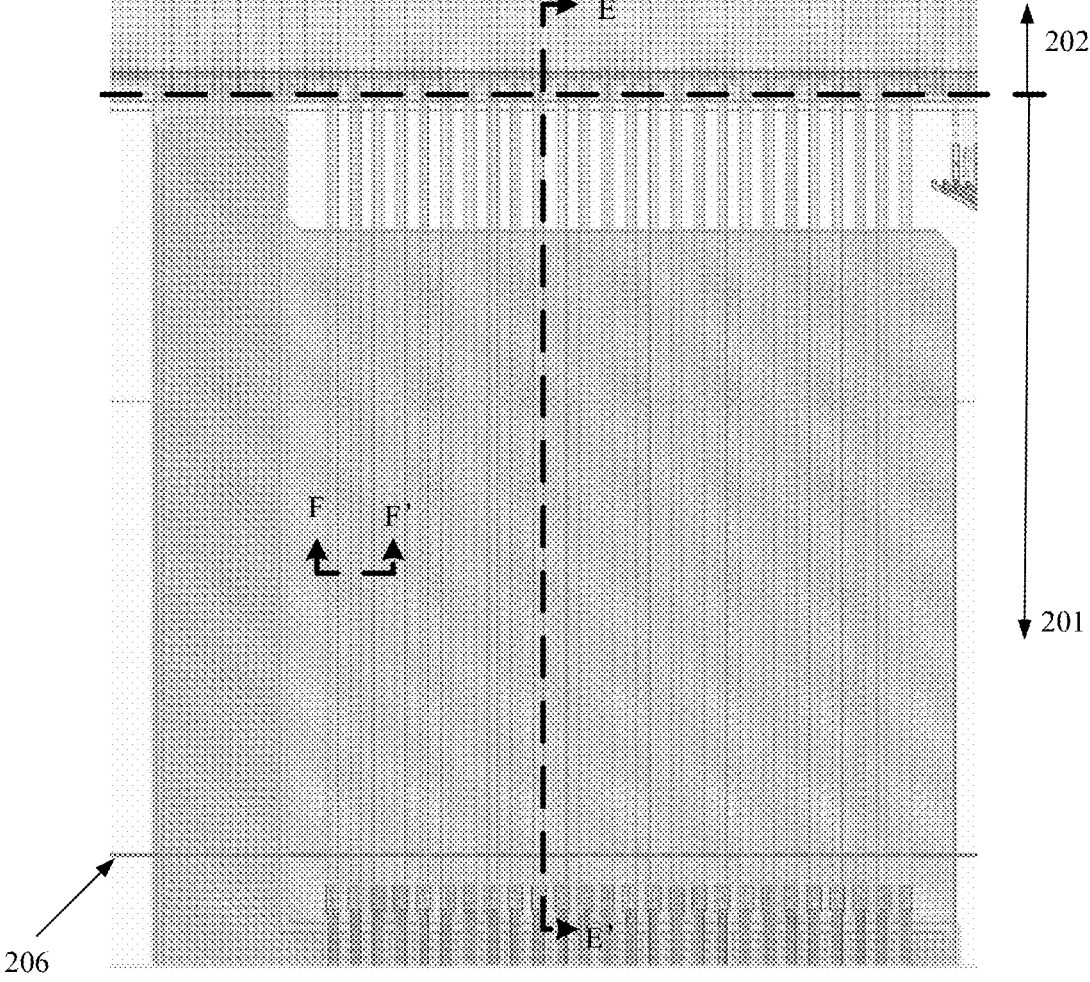
FIG. 12 is a sectional view of the display panel according to another embodiment of the present disclosure.

Based on any one of the above embodiments, in some embodiments of the present disclosure, as shown in FIG. 10, the display panel further includes a second planarization layer 70 covering the flexible area 202 and the first area 201, and a protection layer 80 arranged on a side of the second planarization layer 70 away from the substrate 10. The protection layer 80 covers the flexible area 202 and at least partially covers the first area 201, to remove stresses of the flexible area of the display panel to a certain extent, to prevent the metal wires arranged in the flexible are of the display panel from being broken. In some embodiments of the present disclosure, the protection layer 80 completely covers the flexible area 202 and the first area 201, as shown in FIG. 10. In other embodiments of the present disclosure, the protection layer 80 covers the flexible area 202 and partially covers the first area 201, as shown in FIG. 11. This is not limited in the present disclosure but depends on the situations. Reference is made to FIG. 12, which is a sectional view of the first area 201, the flexible area 202, and the second area 203 in the display panel as shown in FIG. 11. 206 indicates that the protection layer is arranged at the edge of the first area 201.

In some embodiments of the present disclosure, the protection layer is a UV adhesive layer. The touch wiring includes a first titanium metal layer, an aluminum metal layer, and a second titanium metal layer that are stacked. For example, in the touch wiring, the aluminum metal layer has a thickness of 3000 angstroms, the first titanium metal layer arranged on a side of the aluminum metal layer facing the substrate has a thickness of 500 angstroms, and the second titanium metal layer arranged on a side of the aluminum metal layer away from the substrate has a thickness of 500 angstroms. However, the thickness of each of the layers is not limited in the present disclosure but depends on the situations.

It should be noted that the UV adhesive layer has a sulfhydryl group. The sulfhydryl group in the protection layer diffuses in the aluminum metal layer in the touch wiring, and consequently corrodes the aluminum metal layer in the touch wiring. As a result, the titanium metal layer arranged on the aluminum metal layer fractures. Since the titanium metal layer arranged beneath the aluminum metal layer is thin and then the impedance of the touch wiring is increased after the aluminum metal layer is corroded, resulting in poor performance of the touch wiring.

It should further be noted that the sulfhydryl group from the protection layer does not corrode the titanium metal layer in the touch wiring due to chemical stability of titanium. Therefore, the sulfhydryl group from the protection layer is likely to corrode the aluminum metal layer of the touch wiring from sides of the touch wiring instead of directly above the aluminum metal layer.

Figure 13:
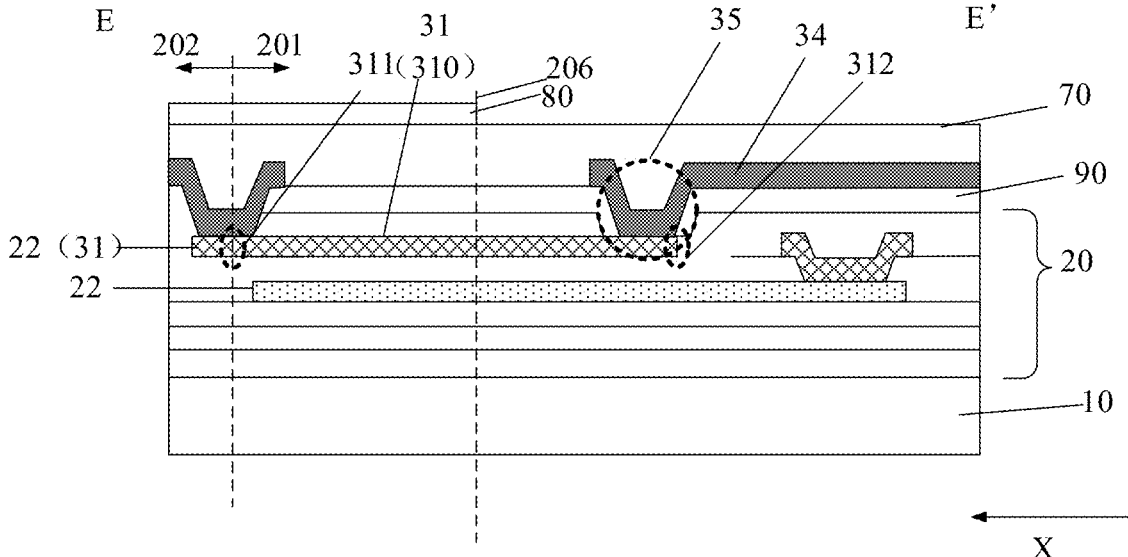
FIG. 13 is a sectional view of the display panel according to another embodiment of the present disclosure.
Figure 14:
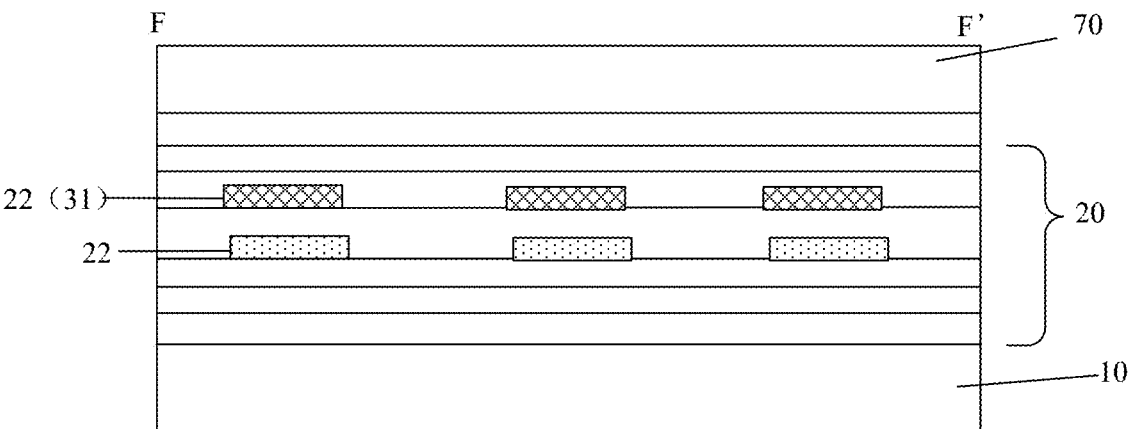
FIG. 14 is a sectional view of the display panel according to another embodiment of the present disclosure.

FIG. 13 is a sectional view of the display panel cut along a line EE' in FIG. 12. FIG. 14 is a cross-sectional view along a line FF' in FIG. 12. The touch wiring 30 includes a first touch wire 310 and a second touch wire 34. The first touch wire 310 is a part of the first touch lead 31 arranged in the array layer 20, and has a first end 311 close to the flexible area 202 and a second end 312 away from the flexible area 202. The second touch wire 34 is arranged from a different layer from the first touch wire 310, and is electrically connected to the first touch wire 310 through a second through hole 35.

In some embodiments, the first touch lead 31 is completely arranged in the array layer 20, as shown in FIG. 13. The second touch wire 34 is a part of the touch wiring 30 rather than a part of the first touch lead 31. The second end 312 of the first touch wire 310 is connected in series with the second touch wire 34 through the second through hole 35, to lengthen the part of the first touch lead 31 (i.e., the first touch wire 310) arranged in the array layer 20, to simplify the process of forming the first touch wire 310.

Figure 15:
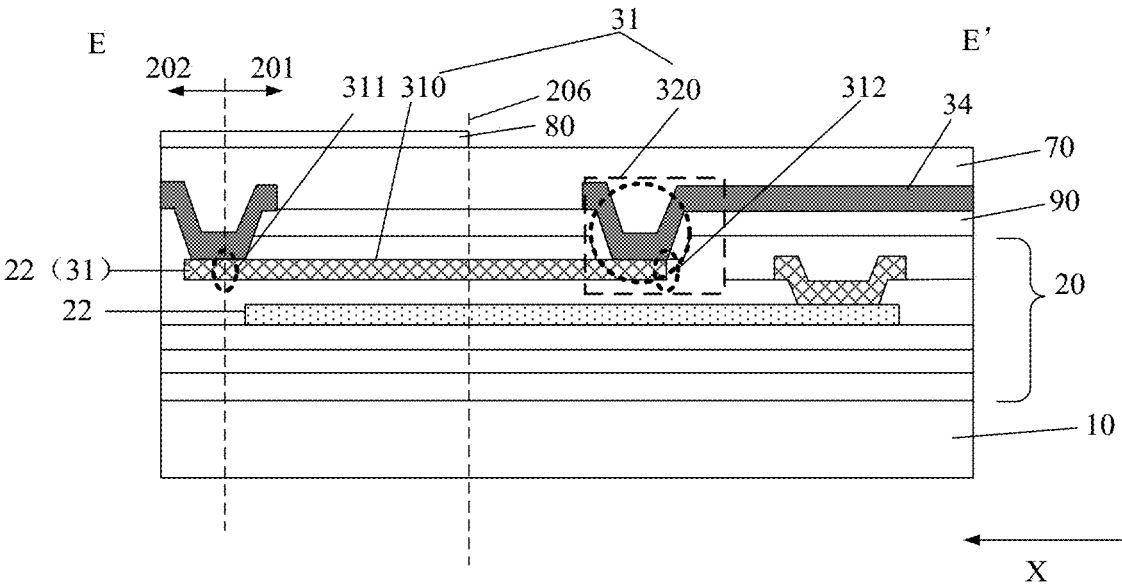
FIG. 15 is a sectional view of the display panel according to another embodiment of the present disclosure.

In other embodiments of the present disclosure, as shown in FIG. 15, the first touch lead 31 is partially arranged in the array layer 20. That is, the first touch wire 310 is arranged in the array layer 20 while a part 320 of the first touch lead 31 is not arranged in the array layer 20. In these embodiments, the second touch wire 34 partially belongs to the first touch lead 31. The first touch wire 310 (i.e., the part of the first touch lead 31 in the array layer 20) is connected in series with the part 320 of the first touch lead 31 not in the array layer 20 through the second through hole 35, to shorten the part of the first touch lead 31 (i.e., the first touch wire 310) in the array layer 20. That is, the first touch wire 310 is small. Therefore, the array layer 20 can have sufficient space to arrange other wirings. This is not limited in the present disclosure but depends on the situations. It should be noted that in other embodiments of the present disclosure, the first touch lead 31 is partially arranged in the array layer 20, and the second touch wire completely belongs to the first touch lead. This is not limited in the present disclosure but depends on the situation.

Based on the above embodiments, in some embodiments of the present disclosure, as shown in FIGS. 13 and 15, the display panel further includes a first dielectric layer 90. The first dielectric layer 90 is at least partially arranged between the first end 311 of the first touch wire 310 and the protection layer 80. The first dielectric layer 90 includes at least one inorganic layer for protecting the first end 311 of the first touch wire 310 from being corroded by the sulfhydryl group from the protection layer 80. That is, the aluminum metal layer in the touch wiring is protected from being corroded, for maintaining performance of the touch wiring.

It should be noted that in the above embodiments, the protection layer only covers the first end of the first touch wire. That is, the sulfhydryl group from the protection layer is likely to corrode the aluminum metal layer in the first touch lead from only the first end of the first touch wire. Therefore, the first dielectric layer 90 is at least partially arranged between the first end of the first touch wire and the protection layer. In other embodiments of the present disclosure, the protection layer further covers the second end of the first touch wire, and then the sulfhydryl group from the protection layer is likely to corrode the aluminum metal layer in the first touch lead from the second end of the first touch wire. Therefore, the first dielectric layer 90 is at least partially arranged between the second end of the first touch wire and the protection layer.

In some embodiments of the present disclosure, as shown in FIG. 13, an orthographic projection of the first dielectric layer 90 on the plane where the substrate 10 is located covers an orthographic projection of the first touch wire 310 on the plane where the substrate 10 is located. An orthographic projection of the protection layer 80 on the plane where the substrate 10 is located does not overlap an orthographic projection of the second through hole 35 on the plane where the substrate 10 is located. That is, the first dielectric layer 90 completely covers the first touch wire 310, and therefore the sulfhydryl group from the protection layer 80 cannot reach the aluminum metal layer in the first touch wire 310 through the second through hole 35, therefore, the aluminum metal layer in the first touch wire 310 can be protected from corrosion, to maintain the performance of the touch wiring.

Figure 16:
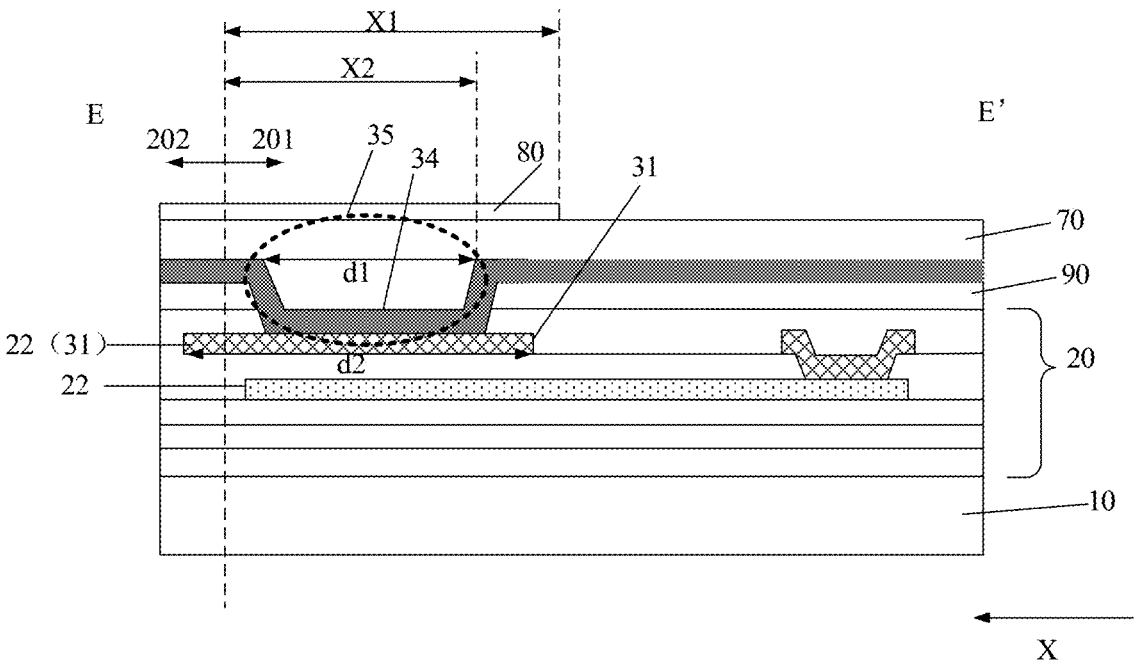
FIG. 16 is a sectional view of the display panel according to another embodiment of the present disclosure.
Figure 17:
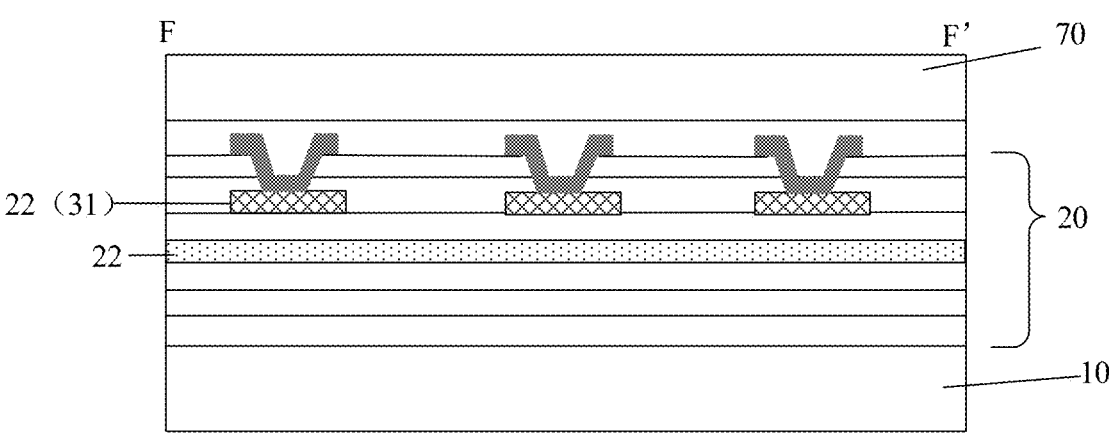
FIG. 17 is a sectional view of the display panel according to another embodiment of the present disclosure.

FIG. 16 is a sectional view of the display panel along a line EE' in FIG. 13. FIG. 17 is a sectional view of the display panel along a line FF' in FIG. 13. The first touch wire 310 is connected in parallel with the second touch wire 34 through the second through hole 35. It should be noted that in the first direction X, a size d1 of the second through hole 35 is less than or equal to a size d2 of the first touch wire 310. That is, the end of the first touch wire 310 close to the flexible area 202 is protected by the first dielectric layer 90, and therefore the impedance of the touch wiring at the first touch wire 310 is small. The performance at the first touch wire 310 is improved.

In some embodiments, as shown in FIG. 16, an edge of the protection layer 80 away from the flexible area 202 is at a first distance X1 from a side of the flexible area 202 away from the second area (not shown in FIG. 16). A side of the second through hole 35 away from the flexible area 202 is at a second distance X2 from the side of the flexible area 202 away from the second area. The first distance X1 is greater than the second distance X2. In these embodiments, the sulfhydryl group from the protection layer 80 is likely to corrode the aluminum metal layer in the first touch wire 310 from both the first end (that is, the end close to the flexible area 202) of the first touch segment 310, and may further corrode the aluminum metal layer in the first touch wire 310 through the second end (that is the end away from the flexible area 202) of the first touch wire 310. Therefore, in the embodiment, the orthographic projection of the first dielectric layer 90 on the plane where the substrate 10 is located covers an orthographic projection of the first end of the first touch wire 310 and an orthographic projection of the second end of the first touch wire 310 on the plane where the substrate 10 is located. That is, both the end of the first touch wire 310 close to the flexible area 202 and the end of the first touch wire 310 away from the flexible area 202 are protected by the first dielectric layer 90.

Figure 18:
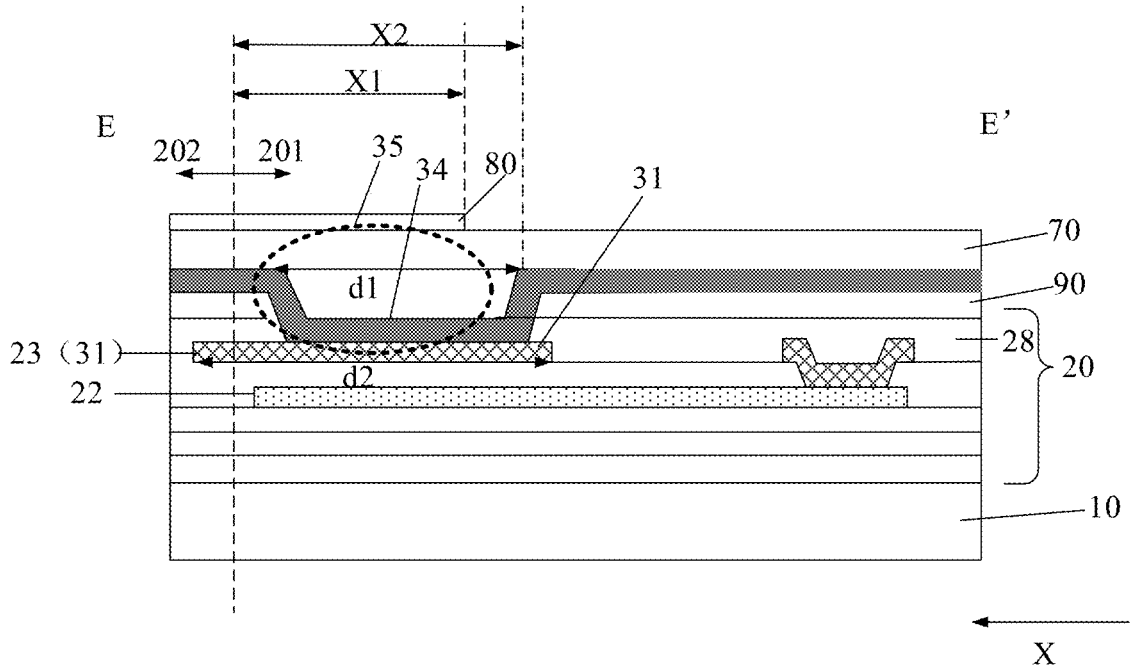
FIG. 18 is a sectional view of the display panel according to another embodiment of the present disclosure.

In other embodiments of the present disclosure, as shown in FIG. 18, the edge of the protection layer 80 away from the flexible area 202 is at a first distance X1 from the side of the flexible area 202 away from the second area (not shown in FIG. 18). The side of the second through hole 35 away from the flexible area 202 is at a second distance X2 from the side of the flexible area 202 away from the second area. The first distance X1 is less than the second distance X2. In these embodiments, the sulfhydryl group from the protection layer 80 is likely to corrode the aluminum metal layer in the first touch wire 310 from the first end (that is, the end close to the flexible area 202) of the first touch wire 310 rather than the second end (that is, the end away from the flexible area 202) of the first touch wire 310. In view of this, the orthographic projection of the first dielectric layer 90 on the plane where the substrate 10 is located at least covers the orthographic projection of the first end of the first touch wire 310 on the plane where the substrate 10 is located. That is, at least the end of the first touch wire 310 close to the flexible area 202 is protected by the first dielectric layer 90.

Based on the above embodiments, in some embodiments of the present disclosure, as shown in FIG. 18, the array layer further includes a third planarization layer 28 arranged between the third metal layer 23 and the first dielectric layer 90. In some embodiments, the third planarization layer is an organic layer, which is not limited in the present disclosure but depends on the situations.

Based on any one of the above embodiments, in some embodiments of the present disclosure, as shown in FIG. 3, a part of the second touch lead 32 in the flexible area 202 is arranged in a same layer as a part of the first touch lead 31 in the first area 201. A part of the third touch lead 33 in the second area 203 are arranged in a same layer as the multiple touch electrodes 60. Therefore, the third touch lead is fabricated along with the touch electrodes, to simplify the process of the touch wiring.

In some embodiments of the present disclosure, the third touch lead 33 includes a first part 331 and a second part 332 that are connected in parallel. The first part 331 is arranged in a same layer as the second touch electrodes. The second part 332 are arranged in a same layer as the bridges 63 for electrically connecting adjacent second touch electrodes 62. In this way, impedance of the touch wiring is small and the process of the touch wiring is simplified.

From the above description, it can be seen that each of the touch electrodes includes a first titanium metal layer, an aluminum metal layer, and a second titanium metal layer that are stacked. Each of the bridges also includes a first titanium metal layer, an aluminum metal layer, and a second titanium metal layer that are stacked. The third touch lead also includes a first titanium metal layer, an aluminum metal layer, and a second titanium metal layer that are stacked, in order to fabricate the third touch lead along with the touch electrodes.

The third touch lead and the third metal layer each include the first titanium metal layer, the aluminum metal layer, and the second titanium metal layer that are stacked. That is, the third touch lead has the identical structure as the third metal layer. Further, the third metal layer is relatively close to the third touch lead. Therefore, in some embodiments of the present disclosure, the part of the first touch lead in the first area is arranged in the third metal layer. That is, the part of the first touch lead in the first area is formed from the third metal layer. In this way, the display panel is thin and the process of the display panel is simplified.

In one embodiment, as described above, in the touch electrode, the aluminum metal layer has the thickness of 3000 angstroms, the first titanium metal layer arranged on the side of the aluminum metal layer facing the substrate has the thickness of 500 angstroms, and the second titanium metal layer arranged on the side of the aluminum metal layer away from the substrate has the thickness of 500 angstroms. In the third metal layer, the aluminum metal layer has the thickness of 6500 angstroms, the first titanium metal layer arranged on the side of the aluminum metal layer facing the substrate has the thickness of 600 angstroms, and the second titanium metal layer arranged on a side of the aluminum metal layer away from the substrate has the thickness of 400 angstroms. The third metal layer is thicker than the touch electrode. Therefore, in the embodiment, the first touch lead is fabricated from the third metal layer, and therefore the impedance of the first touch lead is small. Further, the impedance of the touch wiring is small.

Figure 19:
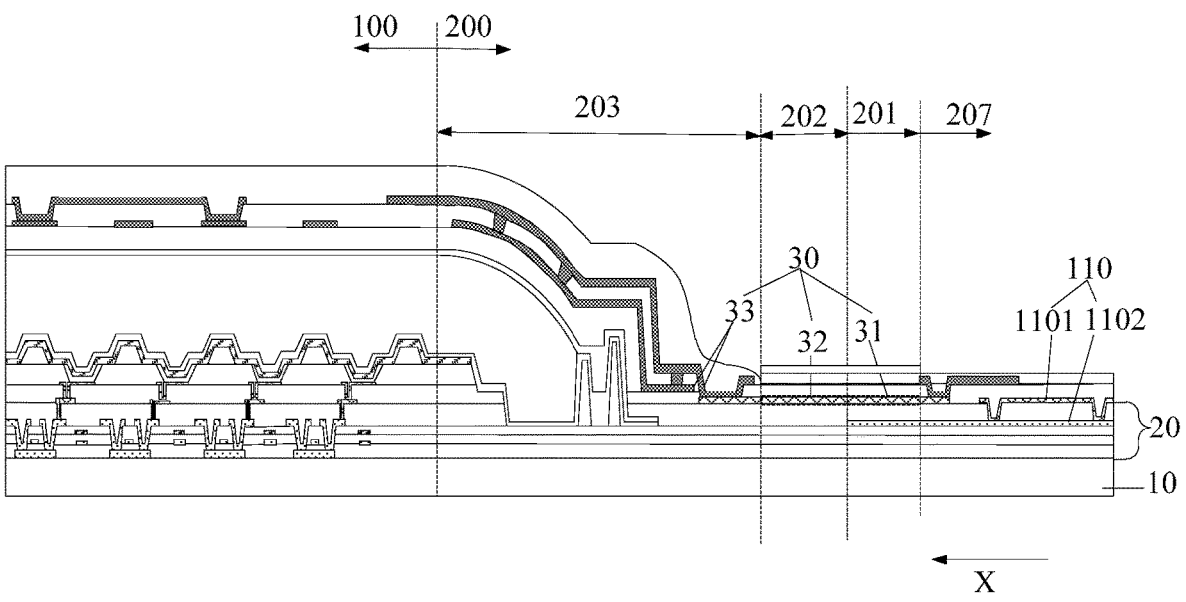
FIG. 19 is a sectional view of the display panel according to another embodiment of the present disclosure.

Based on the above embodiments, in some embodiments of the present disclosure, as shown in FIG. 19, the non-active area further includes a binding area 207 arranged on a side of the first area 201 away from the flexible area 202. In these embodiments, the array layer further includes a first power supply signal wiring 110. A part of the first power supply signal wiring 110 in the first area 201 is arranged in the second metal layer.

In some embodiments of the present disclosure, as shown in FIG. 19, the first power supply signal wiring includes a first power supply segment 1101 and a second power supply segment 1102 that are connected in parallel. The first power supply segment 1101 and the second power supply segment 1102 are arranged in the binding area 207. The first power supply segment 1101 is arranged in the second metal layer, and the second power supply segment 1102 is arranged in the third metal layer. The impedance of the part of the first power supply signal wiring in the binding area is small since the first power supply segment 1101 and the second power supply segment 1102 are connected in parallel. Therefore, the signal suffers from low transmission loss through the first power supply signal wiring.

Figure 20:
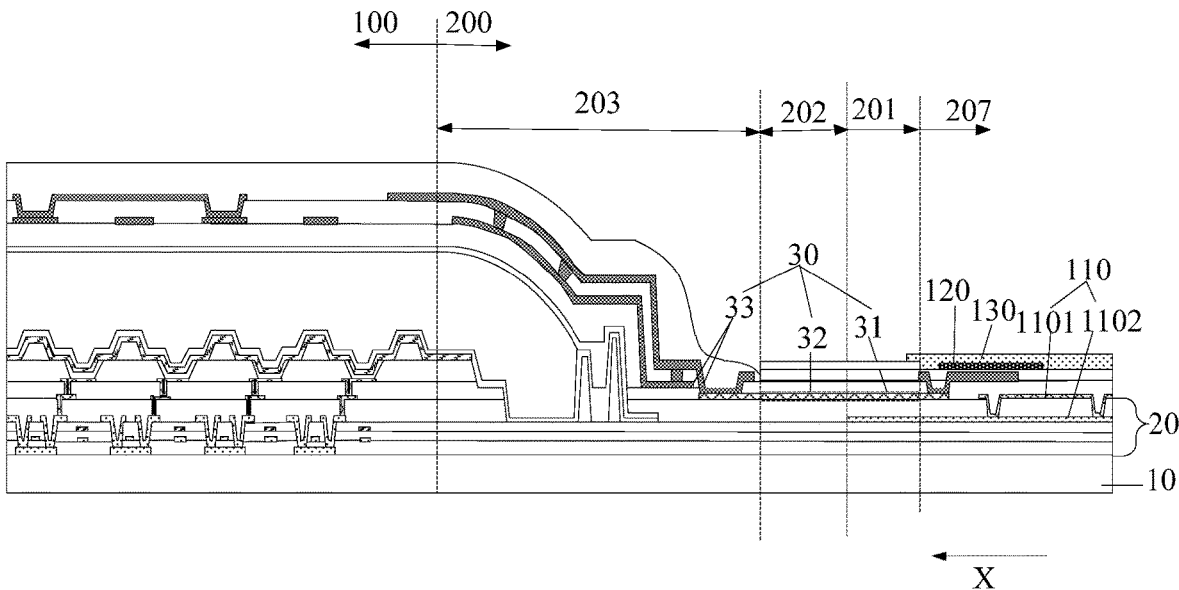
FIG. 20 is a sectional view of the display panel according to another embodiment of the present disclosure.

Based on the above embodiments, in some embodiments of the present disclosure, as shown in FIG. 20, the display panel further includes a circuit board 120 arranged in the binding area 207. Signals are transmitted to the signal wirings in the display panel via the circuit board 120, to control the display panel to display information and sense the touch.

Based on the above embodiments, in some embodiments of the present disclosure, as shown in FIG. 20, the display panel further includes a conductive fabric 130 at least partially covering the circuit board 120. In some embodiment, the conductive fabric is made of a material performing well in electricity conductivity and electromagnetic shielding. However, the conductive fabric is not limited in the present disclosure but depends on the situations.

Figure 21:
FIG. 21 is a schematic diagram illustrating a display device according to an embodiment of the present disclosure.

In addition, a display device is further provided according to embodiments of the present disclosure. FIG. 21 is a schematic structural diagram of the display device according to an embodiment of the present disclosure. As shown in FIG. 21, the display device includes the display panel according to any one of the foregoing embodiments. Therefore, the display device according to the embodiments of the present disclosure has the same beneficial effects as described in the above embodiments, which are not repeated herein. For example, the display device is an electronic device including a mobile phone, a computer, a smart wearable device (e.g., a smart watch), and a vehicle-mounted display device. Alternatively, the display device is a liquid crystal display device, an electrophoresis display device, an organic light-emitting display device, an inorganic light-emitting display device, a field emission display device, a surface conductive electron emission display device, a plasma display device, a cathode ray display device, or the like, which is not limited in the embodiments of the present disclosure.

The embodiments in the specification are described in a progressive way, and each of the embodiments emphasizes the differences from other embodiments. For the same or similar parts among the embodiments, reference can be made to each other.

What is claimed is:

1. A display panel, wherein the display panel is divided into an active area and a non-active area, the non-active area is divided into a first area, a flexible area and a second area sequentially arranged towards the active area, and the display panel comprises:

a substrate;

an array layer, arranged on a side of the substrate;

a touch wiring, comprising a first touch lead, a second touch lead and a third touch lead that are electrically connected, wherein the first touch lead is at least partially arranged in the first area, the second touch lead is at least partially arranged in the flexible area, and the third touch lead is at least partially arranged in the second area; and a data wiring, arranged in the array layer and comprising a first segment, a second segment and a third segment that are electrically connected, wherein the first segment is at least partially arranged in the first area, the second segment is at least partially arranged in the flexible area, the third segment is at least partially arranged in the second area, the first segment is arranged in a different layer from the second segment and is electrically connected to the second segment through a first via hole group, the third segment is electrically connected to the second segment through a third via hole, the first touch lead is at least partially arranged in the array layer on a side of the first via hole group away from the flexible area, and the second touch lead is at least partially arranged in the array layer on a side of the third via hole away from the flexible area, wherein the touch wiring comprises:

a first touch wire, wherein the first touch wire is a part of the first touch lead in the array layer and has a first end close to the flexible area and a second end away from the flexible area; and a second touch wire, wherein the second touch wire is arranged in a different layer from the first touch wire, and is electrically connected to the first touch wire through a second through hole, wherein the display panel further comprises:

a protection layer, wherein the protection layer covers the flexible area and at least partially covers the first area, and the protection layer is an UV adhesive layer with a sulfhydryl group; and a first dielectric layer, wherein the first dielectric layer is at least partially arranged between the first end of the first touch wire and the protection layer, and comprises at least one inorganic layer, wherein an orthographic projection of the first dielectric layer on a plane where the substrate is located covers an orthographic projection of the first touch wire on the plane where the substrate is located, and an orthographic projection of the protection layer on the plane where the substrate is located does not overlap an orthographic projection of the second through hole on the plane where the substrate is located.

2. The display panel according to claim 1, wherein the data wiring comprises a first data wire and a second data wire, the first via hole group comprises a first via hole and a second via hole, the first segment and the second segment of the first data wire are electrically connected through the first via hole, and the first segment and the second segment of the second data wire are electrically connected through the second via hole, wherein the first via hole and the second via hole are arranged on a same straight line, and the straight line is parallel to or intersects with a fold of the flexible area.

3. The display panel according to claim 2, wherein the first via hole and the second via hole are arranged in the same straight line intersecting with the fold of the flexible area, the first via hole is at a minimum distance of L from the second via hole in the first direction, and the first via hole is L1 in diameter, wherein 0≤L≤5L1.

4. The display panel according to claim 1, wherein
the first touch wire is connected in parallel with the second touch wire through the second through hole.

5. The display panel according to claim 4, wherein
an edge of the protection layer away from the flexible area is at a first distance from a side of the flexible area away from the second area, a side of the second through hole away from the flexible area is at a second distance from the side of the flexible area away from the second area, and the first distance is greater than the second distance; and
an orthographic projection of the first dielectric layer on the plane where the substrate is located covers an orthographic projection of the first end and an orthographic projection of the second end on the plane where the substrate is located.

6. The display panel according to claim 4, wherein
an edge of the protection layer away from the flexible area is at a first distance from the side of the flexible area away from the second area, a side of the second through hole away from the flexible area is at a second distance from the side of the flexible area away from the second area, and the first distance is less than the second distance.

7. The display panel according to claim 1, wherein
a part of the second touch lead in the flexible area is arranged in a same layer as a part of the first touch lead arranged in the first area.

8. The display panel according to claim 1, further comprising:
a first touch layer arranged on a side of the array layer away from the substrate, wherein a part of the third touch lead in the second area is arranged in the first touch layer.

9. The display panel according to claim 1, wherein the array layer comprises:
a first metal layer, a second metal layer and a third metal layer that are arranged along a direction perpendicular to a plane where the substrate is located, wherein a part of the first touch lead in the first area is arranged in the third metal layer.

10. The display panel according to claim 9, wherein the array layer further comprises:
a first power supply signal wiring, wherein a part of the first power supply signal wiring in the first area is arranged in the second metal layer.

11. The display panel according to claim 10, wherein
the first power supply signal wiring comprises a first power supply segment and a second power supply segment connected in parallel, the first power supply segment and the second power supply segment are arranged at a side of the first area away from the flexible area, wherein the first power supply segment is arranged in the second metal layer, and the second power supply segment is arranged in the third metal layer.

12. The display panel according to claim 9, wherein the touch wiring is formed by a first titanium metal layer, an aluminum metal layer and a second titanium metal layer that are stacked, and the third metal layer is formed by a first titanium metal layer, an aluminum metal layer and a second titanium metal layer that are stacked.

13. The display panel according to claim 1, wherein along a direction from the non-active area to the active area, a distance between the first via hole group and the third via hole is less than a length of the first touch wire.

14. The display panel according to claim 1, wherein along a direction from the non-active area to the active area, a distance between the first via hole group and the third via hole is consistent with a length of the flexible area.

15. The display panel according to claim 1, wherein the first area is arranged on a side of the first via hole away from the active area, and the flexible area is arranged on a side of the first via hole facing the active area.

16. A display device, comprising:
a display panel, wherein the display panel is divided into an active area and a non-active area, the non-active area is divided into a first area, a flexible area and a second area sequentially arranged towards the active area, and the display panel comprises:
a substrate;
an array layer, arranged on a side of the substrate;
a touch wiring, comprising a first touch lead, a second touch lead and a third touch lead that are electrically connected, wherein the first touch lead is at least partially arranged in the first area, the second touch lead is at least partially arranged in the flexible area, and the third touch lead is at least partially arranged in the second area; and
a data wiring, arranged in the array layer and comprising a first segment, a second segment and a third segment that are electrically connected, wherein the first segment is at least partially arranged in the first area, the second segment is at least partially arranged in the flexible area, the third segment is at least partially arranged in the second area, the first segment is arranged in a different layer from the second segment and is electrically connected to the second segment through a first via hole group, the third segment is electrically connected to the second segment through a third via hole,
the first touch lead is at least partially arranged in the array layer on a side of the first via hole group away from the flexible area, and
the second touch lead is at least partially arranged in the array layer on a side of the third via hole away from the flexible area,
wherein the touch wiring comprises:
a first touch wire, wherein the first touch wire is a part of the first touch lead in the array layer and has a first end close to the flexible area and a second end away from the flexible area; and
a second touch wire, wherein the second touch wire is arranged in a different layer from the first touch wire, and is electrically connected to the first touch wire through a second through hole, wherein the display panel further comprises:
a protection layer, wherein the protection layer covers the flexible area and at least partially covers the first area, and the protection layer is an UV adhesive layer with a sulfhydryl group; and
a first dielectric layer, wherein the first dielectric layer is at least partially arranged between the first end of the first touch wire and the protection layer, and comprises at least one inorganic layer,
wherein an orthographic projection of the first dielectric layer on a plane where the substrate is located covers an orthographic projection of the first touch wire on the plane where the substrate is located, and an orthographic projection of the protection layer on the plane where the substrate is located does not overlap an orthographic projection of the second through hole on the plane where the substrate is located.

* * * * *